No. 788,360. Patented April 25, 1905.

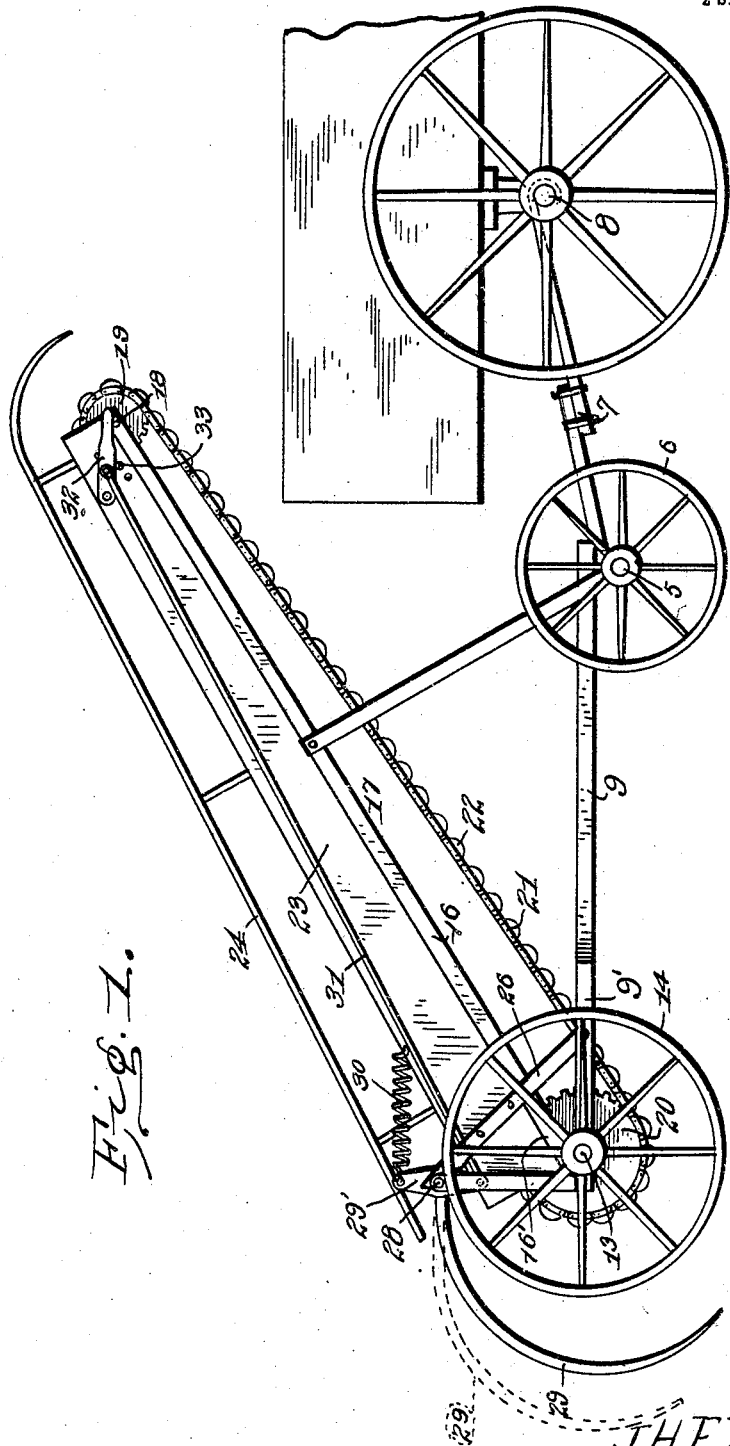

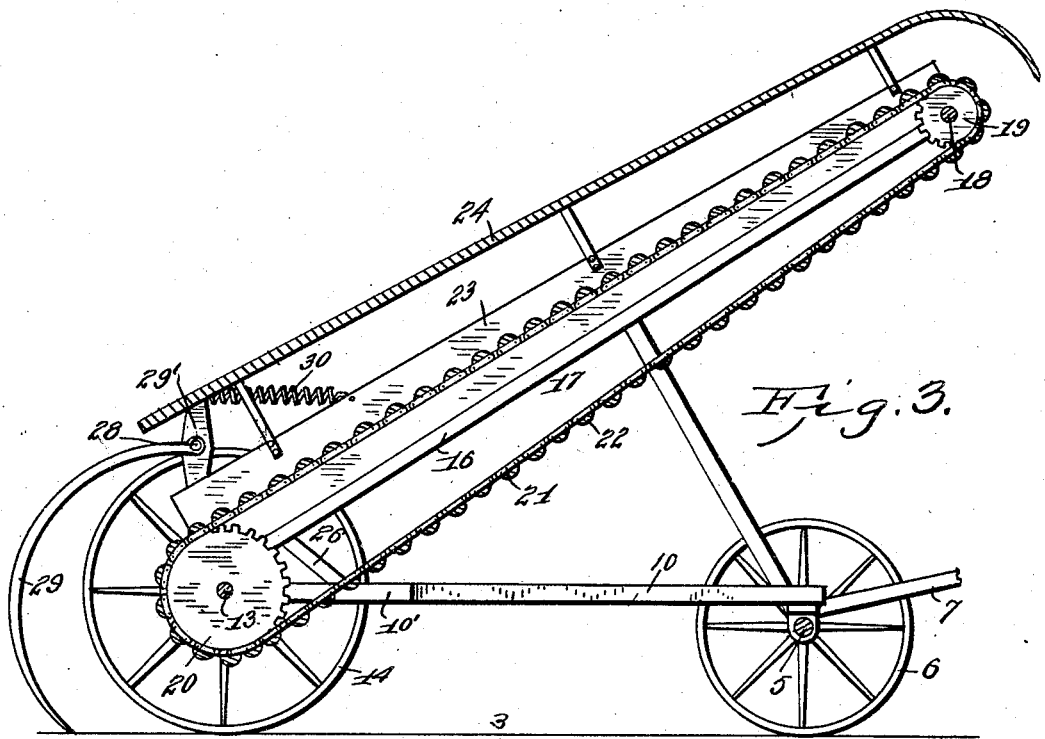
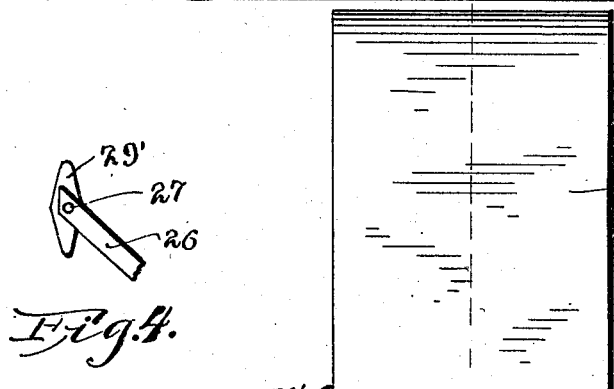
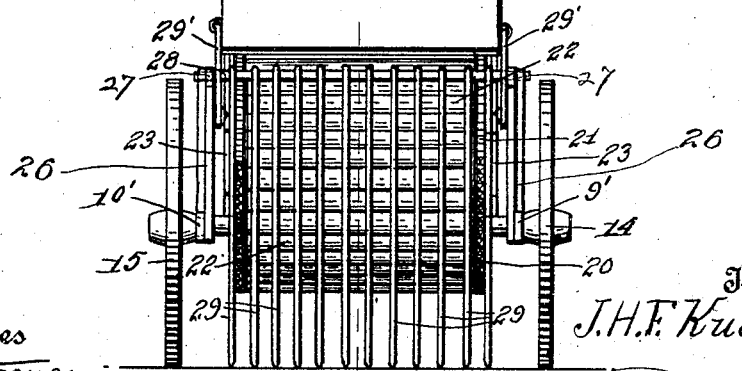

UNITED STATES PATENT OFFICE.

JULES H. F. KUEHL, OF IROQUOIS, SOUTH DAKOTA.

HAY-LOADER.

SPECIFICATION forming part of Letters Patent No. 788,360, dated April 25, 1905.

Application filed July 25, 1904. Serial No. 218,132.

*To all whom it may concern:*

Be it known that I, JULES H. F. KUEHL, a citizen of the United States, residing at Iroquois, in the county of Kingsbury, State of South Dakota, have invented certain new and useful Improvements in Hay-Loaders; and I do hereby declare the following to be a full, clear, and exact description of the invention, such as will enable others skilled in the art to which it appertains to make and use the same.

This invention relates to loaders, and more particularly to those for loading hay or similar matter upon a wagon, and has for its object to provide a loader which may be attached to a wagon and which will gather the hay from the ground and deposit it upon the wagon as the latter is driven over the field.

A further object is to provide a construction which will permit of movement of the hay-gathering mechanism into and out of operative position.

In the drawings forming a portion of this specification, and in which like numerals of reference indicate similar parts in the several views, Figure 1 is a side elevation of the present invention attached to a wagon. Fig. 2 is an end view of the loader. Fig. 3 is a longitudinal section on line 3 3 of Fig. 2.

Referring now to the drawings, the present invention comprises the forward axle 5, upon which are mounted wheels 6, and which has a forwardly-extending longitudinally-adjustable pole 7, arranged for connection at its forward end with the rear axle 8 of a vehicle.

Extending rearwardly from the axle 5 are members 9 and 10, the rearward end portions 9' and 10' of which are provided with bearings, in which there is mounted a revoluble axle 13, having a wheel 14 rigidly mounted upon one of its ends, and a similar wheel 15 loosely mounted upon its remaining end, this arrangement being provided to permit of turning the machine, though it will be understood that any other compensating mechanism may be used. Secured to the rearward portions 9' and 10' of the members 9 and 10 are the lower reaward ends 16' of side portions 16 of a framework 17, which extends forwardly and upwardly and lies with its upper end forwardly of the wheels 6, the upper ends of the side portions 16 being connected by a transverse cylindrical bar 18, having sprockets 19 revolubly mounted thereon, which lie adjacent to the inner faces of the portions 16. Rigidly mounted upon the axle 13 are a similar pair of sprockets 20, and engaged with the corresponding pairs of these sprockets are the side chains 21 of a carrier 22.

Extending upwardly from the side portions 16 are longitudinal walls 23, and secured to the upper edges of the walls is a cover 24, which is spaced from the carrier 22, as shown, for the passage of hay therebetween. Extending upwardly and rearwardly from the members 9 and 10 are braces 26, which are secured to the walls 23 and extend beyond the outer edges thereof, the outer ends of the braces being provided with bearings 27, in which there is mounted a shaft 28, having secured thereto a plurality of curved rake-teeth 29 of the usual type, which are disposed in position to gather hay from the ground, though the shaft may be moved in its bearings to raise the teeth, as shown in dotted lines in Fig. 1. Secured to the ends of the shaft 28 are parallel plates 29', the ends of which extend beyond the shaft in opposite directions, and secured to the upper ends of these plates at one end and at the remaining end to the walls 23 are helical springs 30, the tendency of which is to hold the shaft yieldably with the teeth raised from the ground, and to hold the shaft against the action of these springs and with the teeth in operative position rods 31 are pivoted at one end to the lower ends of the plates 29' and at their remaining ends to levers 32, which are pivoted to the outer faces of the walls 23, adjacent to the upper ends thereof. The rods 31 are pivoted to the levers 32 between the free ends thereof and their points of pivotal connection with the walls 23, so that the levers 32 are movable upon their pivots to move the shaft 28 in its bearing. Upon reference to Fig. 1 of the drawings it will be seen that the spring 30 by pulling on the plate 29' swings the latter, and thus pulls on the rod 31 and holds the lever 32 against the pin 33. The pin 33 acts as a stop for the lever 32, so that the spring 30 cannot swing the plate 29' sufficiently far to raise the teeth 29 out of active position. If, however, the free end of the lever 32 be raised, so as to carry the connected end of the rod 31 above the pivot-point of the lever, then the lever may continue in its pivotal movement until it lies parallel with the rod 31, during which time the rod will move longitudinally and permit the plate 29' to be swung by the spring 30, so that the shaft 28 will be rocked to raise the teeth 29 to the dotted-line position in Fig. 1. It will thus be seen that by means of these levers a person upon the vehicle may move the teeth into and out of operative position when desired.

What is claimed is—

1. In a hay-loader, the combination with a wheeled frame, of a shaft journaled in the frame, rake-teeth carried by the shaft, said shaft being movable to bring the teeth into position to gather hay from the ground, a carrier mounted upon the frame and extending upwardly therefrom and disposed with its upper end in position to discharge into a receptacle, connections between the carrier and the wheels for operation of the former, said carrier being disposed to receive hay from the teeth, a wall disposed at either side of the carrier, a cover secured to the outer edges of the walls, means for holding the shaft yieldably with the teeth in inoperative position and means for holding the shaft against the action of the first-mentioned holding means.

2. In a hay-loader, the combination with a wheeled frame, of a carrier mounted upon the frame and connected with the wheels thereof for operation thereby, the carrier being disposed to discharge into a receptacle, a wall disposed at either side of the carrier, a shaft journaled upon the frame, rake-teeth carried by the shaft, said shaft being movable to bring the teeth into and out of position to gather hay from the ground, oppositely-extending arms carried by each end of the shaft, a pair of springs secured to one arm at each end of the shaft at one end and at their remaining ends to the side walls to hold the shaft yieldably with the teeth in inoperative position, a rod pivoted at one end to the remaining arm at each end of the shaft, levers pivoted at one end to the walls, said rods being pivoted at their remaining ends to the levers between the ends thereof, said levers being movable upon their pivots to move the shaft against the action of the springs, pins disposed at one side of the pivot-points of the levers for engagement by the levers to hold them in position to maintain the shaft with the teeth in operative position, said levers being movable to bring the points of pivotal connection of the rods therewith to the opposite sides of the pivot-points of the levers to permit of movement of the shaft under the action of the springs.

In testimony whereof I affix my signature in presence of two witnesses.

JULES H. F. KUEHL.

Witnesses:
C. E. SWANSON,
BLANCHE WHITING.